June 29, 1965 W. H. WEST 3,192,499
SAFETY FASTENING MEANS
Filed Jan. 5, 1961

INVENTOR.
WILSON H. WEST
BY
Albert H. Reuther
HIS ATTORNEY

United States Patent Office 3,192,499
Patented June 29, 1965

3,192,499
SAFETY FASTENING MEANS
Wilson H. West, Madison Heights, Mich., assignor to General Motors Corporation, Detroit, Mich., a corporation of Delaware
Filed Jan. 5, 1961, Ser. No. 80,915
1 Claim. (Cl. 339—91)

This invention relates to fastening means, and particularly, to safety measures to assure against accidental separation of components that are used on a vehicle having power actuated accessories and the like to be reliably energizable at all times.

An object of this invention is to provide new and improved safety fastening means on connectors for easy assembling and positive retention.

Another object of this invention is to provide safety fastening means to retain male and female connector components together, though permitting easy assembly and snap action to aid in making a blind assembly in limited space such as to avoid complaints on power window failures at locations enclosed in doors and quarter panels of vehicles where removal of trim pads is a problem to provide access to the male and female connector components.

A further object of this invention is to provide safety fastening means to assure against accidental separation of a pair of mating and telescoping substantially cylindrical connector components of insulating material including a female portion which has a laterally located cut-out or slot to provide a locking shoulder and a male portion which has a longitudinally extending integral arm means and tab end to extend at least in part out of the female portion after telescoping assembly of the components such that an inclined laterally outwardly extending abutment adjacent to the tab end of the arm means can snap into mating engagement with the cut-out or slot and locking shoulder even though separable therefrom by application of pressure to the tab end for displacing the arm means and abutment laterally from the locking shoulder before longitudinal separation of the components can occur.

Further objects and advantages of the present invention will be apparent from the following description, reference being had to the accompanying drawings wherein preferred embodiments of the present invention are clearly shown.

In the drawings:
FIGURE 1 illustrates fastening means and mating connector components in perspective in accordance with the present invention.

During mass production manufacture of vehicle bodies there is a progressive assembly of parts and components some of which become difficult to reach for servicing once a vehicle is completed. In recent years there has been an increased provision of power-operated accessories and the like requiring reliability in operation to assure customer satisfaction and to avoid possible inconvenience. An example of such power-operated accessories can be found in window actuators installed to be reciprocable in vehicle doors and panels in accordance with selective energization of actuators either by passengers or a vehicle operator having access to switch means such as disclosed in a patent, 2,919,315—Woofter, belonging to the assignee of the present invention. Installation of interior trim along doors and quarter panels of a vehicle as disclosed in co-pending application S.N. 2,383 filed January 14, 1960, now Patent 3,054,213—Mathues issued to the assignee of the present invention on September 18, 1962, can result in difficulty and limitation in access to connections between control switch means and a power window actuator, for example. Removal of upholstery and trim components can prove expensive and time consuming particularly when accidental separation of mating and telescoping components occurs to result in a break or loose connection either due to faulty initial installation or due to shocks and vibrations encountered during use of a vehicle subject to various road conditions as well as repeated opening and shutting of a door. Sometimes a vehicle door is inadvertently slammed shut and unknowingly a separation of connector components can occur to interrupt supply of power to window actuators such that servicing is required before a window can be opened or shifted to a closed position for locking a vehicle when it is to be left unattended. Connector components can be fitted with terminal means such as disclosed in Patent 2,682,038—Johnson, belonging to the assignee of the present invention but forming no part of the present invention. It is to be understood that any suitable terminals can be mounted for mating inside connector components provided with safety fastening means in accordance with the present invention.

Figure 1:
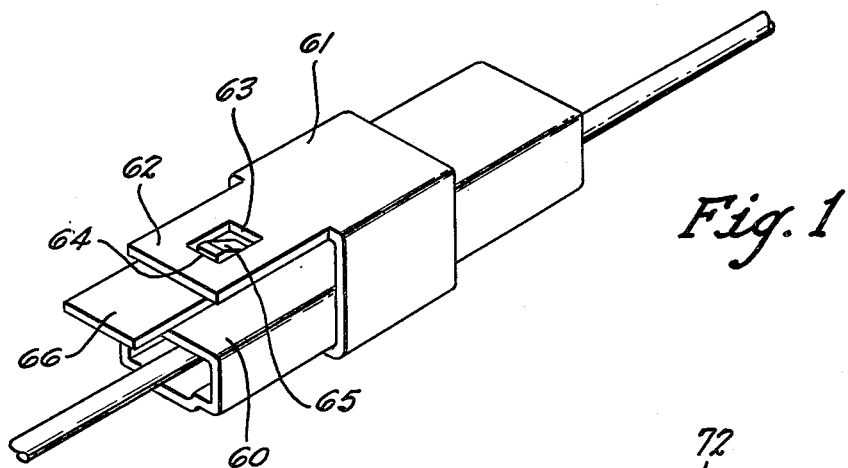

FIGURE 1 illustrates in perspective a male connector component 60 adapted to telescope in a female connector component or body portion 61 both having mating terminal means therein attached to wires or leads projecting from opposite sides of the connector components. Integral with the connector component 61 of insulating material there is a longitudinally extending and deflectable wall portion 62 having a cutout or slot 63 therein to form a transverse shoulder 64 engaged by an inclined abutment 65 integral with a laterally displaceable tab-like projection on arm 66 having a free end that extends beyond the wall portion 62 as well as an end integral with the connector component 60 of insulating material. The inclined abutment 65 can pass along an internal surface of the transverse shoulder portion 64 and the free end of the arm 66 can be pushed laterally inwardly to disengage the abutment from the shoulder in a manner similar to that illustrated by FIGURE 3 as described in further detail in the following paragraphs.

Figure 2:
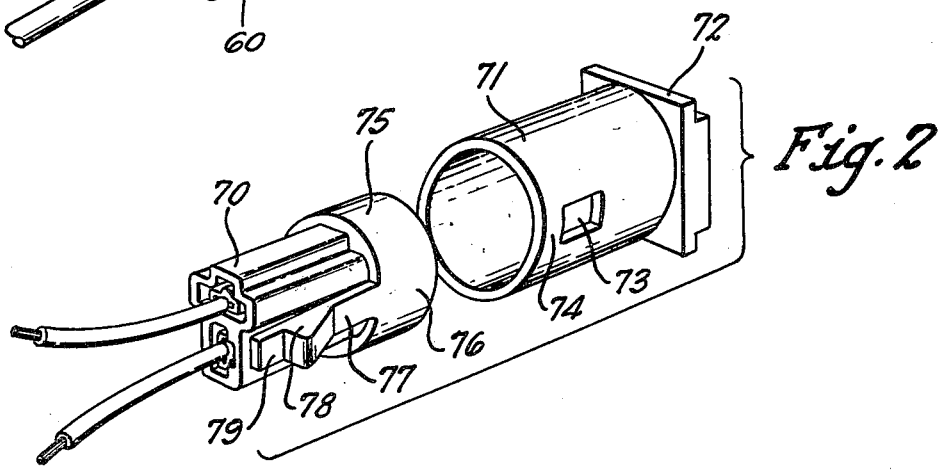
FIGURE 2 is an exploded perspective view of further fastening means and mating components of insulating material in accordance with the present invention.
Figure 3:
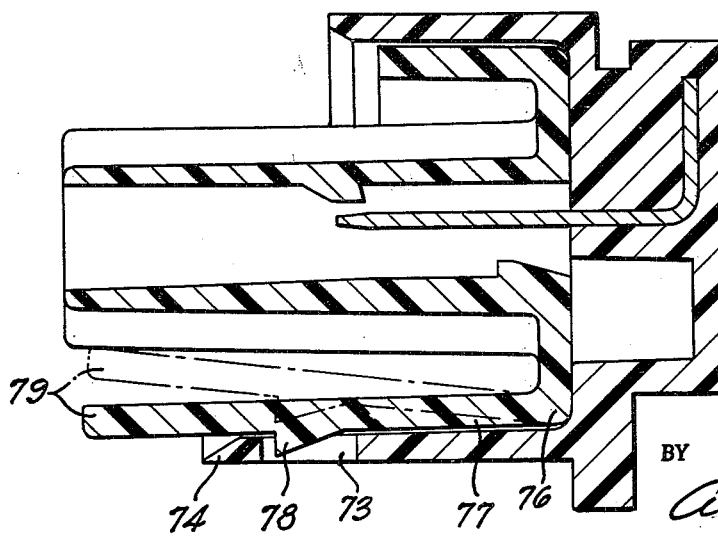
FIGURE 3 is a cross-sectional view to illustrate assembly and separation of mating connector components provided with fastening means similar to those illustrated in FIGURE 2 in accordance with the present invention.

Juncture of spring-like or resilient arm 66 with the connector component 60 is similar to that illustrated in the exploded perspective view of connector components 70 and 71 illustrated in FIGURE 2 though having substantially cylindrical rather than rectilinear cross-sectional configuration. The female connector component 71 can be mounted on a power window actuator or driving means having a dynamoelectric machine with terminals extending therefrom to an inner periphery or location of the female connector component 71. A base 72 integral with the cylindrical body portion of the connector component 71 can be used for mounting this socket-like structure on the actuator for power windows in a location between a door panel and a trim pad. The cylindrical body portion of the connector component 71 has a cut-out or slot 73 to define a transverse shoulder portion or segment 74 longitudinally or axially in alignment therewith. The connector component 70 has a substantially cylindrical male portion 75 which is less than the internal diameter of the cylindrical body portion of connector component 71 but which is larger than the rectilinear body portion or terminal mounting means of substantially rectilinear shape forming part of the male component 70. A juncture 76 makes a laterally deflectable resilient arm or projecting portion 77 integral with the cylindrical portion 75 of the male connector component 70 and this arm or projecting portion 77 has an inclined abutment 78 extending laterally outwardly thereon adjacent to an extension or tab end 79. Reference numerals applied in FIGURE 2 are shown also in FIGURE 3 to illustrate these connector components in mating relationship. The tab end 79 extends beyond an edge or periphery of the female connector component. The abutment 78 fits into cut-out or slot 73 and a transverse shoulder forming portion 74 can be engaged by one end of this abutment. An outline of displacement of the tab end 79 is provided to illustrate dislocation and flexing of the resilient arm or projecting portion 77. The cross-sectional features of the mating connector components illustrated in FIGURES 2 and 3 differ slightly from the features represented by the perspective views of FIGURES 1 and 2 but the safety fastening means involving the use of integral spring-like arms with a juncture such as 76 between male connector components and the arms is best illustrated in the view of FIGURE 3. It is apparent that reference numeral 74 as to a transverse shoulder portion shown in FIGURE 3 is similar to the shoulder represented by numeral 64 on a wall projection 62 in FIGURE 1. By laterally inwardly deflecting the arm such as 77 due to application of pressure to tab ends such as 66 and 79, it is possible to effect disengagement of the abutments such as 78 and 65 with respect to the transverse shoulder portions such as 74 and 64. Only by releasing locking engagement of the abutment and shoulder portion from each other can the connector components be separated and thus there is avoided any possibility of accidental disconnection and separation of any power supply by way of these connector components. Snap fit of the abutment such as 78 or 65 into slots such as 73 or 63 permits service installation of these connector components into mating relationship manually since anyone installing these components can ascertain proper installation upon sensing of this snap fitting engagement as indication thereof is transmitted to the fingers. The arm or projecting portion integral with the male connector component is sufficiently flexible to return to a position substantially parallel to though spaced laterally to one side of the connector component.

Once engaged, the connector component or plug is securely locked to a power window actuator connector body, for example, thus preventing accidental dislocation of electrical contact established thereby regardless of vibrations and slamming of a door. The connection can be easily disengaged by pressing down the tab end of the resilient arm to unlock the connection. By adding a proper and locked engagement of connector components for power window regulators or actuators necessity for removing upholstery or door trim and panel trim is avoided. This results in a saving of time and money as well as inconvenience for customers who are satisfied with their power accessories.

While the embodiments of the present invention herein disclosed constitute preferred forms, it is to be understood that other forms might be adopted.

What is claimed is as follows:

An electrical connector comprising telescoping male and female units, male electrical contact means within said female unit axially received in female electrical contact means within said male unit, a locking arm integral with the inner end of said male unit and having a free end extending outwardly beyond said male and female units when said electrical contacts are mated, said locking arm having a detent with a cam surface, an inner wall of said female unit having a shoulder to receive said detent in locking engagement, said male unit being arranged with respect to said female unit to permit said locking arm to be flexed inwardly in a direction generally perpendicular to the direction of mating of said units whereby said detent may be depressed out of engagement with said shoulder to effect separation of said male and female connector units.

References Cited by the Examiner

UNITED STATES PATENTS

| 144,888 | 11/73 | Campbell | 287—119 |
| 2,046,221 | 6/36 | Thomas | 339—91 |
| 2,194,769 | 3/40 | Reed | 339—91 |
| 2,363,520 | 11/44 | Fish | 306—28 X |
| 2,692,781 | 10/50 | Langilla | 285—7 |
| 2,712,118 | 6/55 | Humma | 339—74 |
| 2,982,586 | 5/61 | Gliebe | 287—119 X |

FOREIGN PATENTS 845,697  8/60  Great Britain.

JOSEPH D. SEERS, *Primary Examiner.*

CORNELIUS D. ANGEL, CARL W. TOMLIN,
*Examiners.*